ized Patent [19]

Alexandrov et al.

[11] 4,030,891
[45] June 21, 1977

[54] SINTERED CERMET CONTAINING GROUND MONOCRYSTALS

[76] Inventors: Vladimir Ilich Alexandrov, ulitsa Ostrovityanova, 31, kv. 281; Vyacheslav Vasilievich Osiko, ulitsa Vavilova, 48, kv. 63, both of Moscow; Ernest Nikolaevich Muraviev, ulitsa Popova, 10, kv. 36, Fryazino Moskovskoi oblasti; Eduard Georgievich Spiridonov, Preobrazhensky val, 24a, kv. 1, Moscow; Vladimir Mikhailovich Tatarintsev, Leninsky prospekt, 45, kv. 112, Moscow; Vladimir Grigorievich Gordon, 13 Parkovaya, 31, korpus 1, kv. 83, Moscow, all of U.S.S.R.

[22] Filed: Dec. 2, 1974

[21] Appl. No.: 528,774

[52] U.S. Cl. .............................. 75/234; 75/DIG. 1; 75/235; 75/236
[51] Int. Cl.$^2$ .......................................... C22C 1/09
[58] Field of Search .............. 75/DIG. 1, 208, 206; 29/182.7, 182.8, 182.5

[56] References Cited

UNITED STATES PATENTS

| 3,098,723 | 7/1963 | Micks | 29/183.5 |
| 3,114,197 | 12/1963 | DuBois | 75/DIG. 1 |
| 3,364,975 | 1/1968 | Gruber | 75/DIG. 1 |
| 3,547,180 | 12/1970 | Cochran | 75/DIG. 1 |

*Primary Examiner*—Arthur J. Steiner

[57] ABSTRACT

A matrix of a heat-resistant material with a filler of refractory oxides of metals contained in the matrix in the form of ground monocrystals.

5 Claims, No Drawings

SINTERED CERMET CONTAINING GROUND MONOCRYSTALS

BACKGROUND OF THE INVENTION

The present invention relates to heat-resistant materials. Example of such materials are ceramic and metal-ceramic materials, generally known as cermets, heat-resistant metals and alloys and also refractory concrete. The invention can be advantageously used for all of the above-mentioned materials.

Widely known in the art are refractory ceramic materials based on refractory oxides of metals. Among these are differentiated materials with a monolithic structure and with a porous structure.

Refractory ceramic materials possessing a porous structure have a higher heat resistance as compared to the same materials of a monolithic structure.

The higher heat resistance of the former can obviously be explained by the fact that pores retard the development of microcracks resulting from thermal stresses in the material body. However, a porous structure reduces the mechanical strength of the material and hence, its resistance to erosion. Due to this, porous ceramic materials have but limited application. In particular, they may be used only under conditions of a gaseous medium not containing fumes of alkali metal compounds.

This is attributed to the fact that the condensing of alkali compounds in the pores of a refractory material leads to further hydration and carbonization of the alkaline compounds which results in a sharp increase in the volume of the material and thereby in its deterioration. The utilization of porous ceramic materials in metal or glass melting furnaces is not justified since the refractories are exposed to a purely mechanical effect or an aggressive chemical action of the molten metal or glass.

Moreover, these materials can not be used in high temperature assemblies of a magnetic hydrodynamic generator whose medium contains fumes of an alkali metal. Condensation of these fumes occurs within a zone confined between 900° C and 1200° C isotherms. On cooling, alkali compounds become hydrated and carbonized by moisture and carbon dioxide from the air, respectively, which is accompanied by a sharp increase in the material volume and as a result by refractory peeling off or exfoliation.

There are also well known refractory ceramic materials based on refractory oxides of metals with fillers from refractory oxides of metals, the crystalline structure of these ceramic materials representing strand- or needle-like monocrystals.

These materials possess a higher mechanical strength and greater resistance to erosion as compared with porous materials.

The employment of such materials, however, involves considerable difficulties. The main problem is to ensure and maintain orientation and integrity of the above-mentioned crystals on their introduction into the matrix which, in this particular case, provides for the material as a whole to obtain a higher mechanical strength and improved resistance to erosion.

At present, there are no sufficiently reliable methods of shaping these materials. Even the most practicable method of shaping which is slip casting, does not provide the above-mentioned orientation and integrity of strand- or needle-like monocrystals. Up to now such materials have been produced, in fact, only under laboratory conditions.

Moreover, the process itself for producing strand-or needle-like crystals is at a stage of laboratory studies; their commercial production is not yet under way. Obviously, the manufacture of refractories with the afore-mentioned fillers is an expensive and inefficient process, therefore at the present time it is difficult to talk about their commerical application.

Well known cermets have a disadvantage consisting in that when used under oxidizing conditions or exposed to the effect of a high speed and high temperature gas flow (for instance, in the channel of a magnetic hydrodynamic generator) their resistance to erosion proves to be insufficient.

As experience has shown, these cermets can withstand no longer than 100 hours of operation under such conditions.

As known, at high temperatures heat-resistant materials start creeping and, in addition to this, have a low resistance to oxidation and erosion.

Well known types of refractory concrete contain refractory oxides of metals as filler materials, such as corundum or periclase in the form of polycrystalline fines obtained by grinding sintered briquettes or electric melted ingots.

The main disadvantage with the above types of concrete is that under the effect of a high temperature oxidizing gas flow with an alkali metal additive (as, for example, in the channel of an open-cycle magnetic hydrodynamic generator), rapid deterioration of the concrete surfaces occurs due to erosion and reaction between the aggregate (in the case of corundum) and the alkali metal.

SUMMARY OF THE INVENTION

The objects of the present invention are as follows: to improve the heat the resistance, resistance to oxidation and erosion and also mechanical the strength of heat-resistant materials such as refractory ceramic and metal-ceramic materials and refractory concrete as well as to drastically minimize creep the of heat-resistant materials at elevated temperatures.

The above objects are accomplished by providing a heat-resistant material with a filler of refractory oxides of metals in the form of monocrystals which heat-resistant material, according to the invention, contains these monocrystals in the form of ground matter.

When using the aforementioned filler, the matrix of the material may be a ceramic or metal-ceramic one as well as a heat-resistant metal or refractory concrete.

The grain size of the ground monocrystals may be in the range of from 2 mm down to 1 $\mu$m. The quantity of the filler may vary from 1 to 90 wt. % of the total weight of the material.

Hereinafter is given a detailed description of the invention illustrated by particular embodiments thereof taken by way of example.

As mentioned above, the scope of our invention may be extended to any heat-resistant material and, in particular, to refractory oxidizing and oxygen-free ceramic and metal-ceramic materials, heat-resistant metals and refractory concrete.

Due to introducing a filler of ground monocrystals of refractory oxides of metals into the composition of each of the above materials, such properties as mechanical strength, resistance to erosion and oxidation are substantially improved whereas creep, in the case of metals, is minimized.

Below will be given a number of examples illustrating characteristics of corresponding materials containing a filler in accordance with the invention. The quantity of the filler should be the same as that of polycrystalline filling matter when introduced into known ceramic materials and concrete, in particular, from 20 to 60 wt. %.

In the case of a metallic matrix, the filler quantity may vary from 1 to 90 wt. %. With the filler content from 1 to 5 wt. %, a drastic drop in creep occurs at elevated temperatures in the case of heat-resistant metals. A further increase in the contents of the filler, taken in accordance with the invention, especially in the range between 20 wt. % and 90 wt. % additionally leads to a considerable reduction in their oxidizability and improved resistance to erosion.

The particle size of the ground monocrystals may be selected within a range of from 1 $\mu$m to 2 mm.

Grinding of the monocrystals is done in an installation for grinding solid materials (mills, grinders).

When producing ceramic and metal-ceramic materials the filler is introduced in the course of preparing an initial mixture by means of, or instance, blending with the other constituents of the mixture.

In the production of concrete the filling material (aggregate) is introduced into the binder.

In the case of heat-resistance metals the filler is introduced into the metal powder. Further shaping of products is done in all cases, except concrete, using powder metallurgy techniques (pressing, sintering).

Concrete products are made in a conventional manner. Curing conditions are the same as those commonly adopted. The curing time to provide strength to quality standards depends on the properties of the binder employed.

DETAILED DESCRIPTION OF PREFERRED EMBODIMENTS

EXAMPLE 1

A heat-resistant material consisted of an oxidizing ceramic matrix aluminium oxide of, and a filler in the form of ground ruby monocrystals.

| Matrix | 70 wt. % |
|---|---|
| Filler | 30 wt. % |
| The degree of the filler dispersion as follows: | |
| from 2 mm down to 1 mm | 40 wt. % |
| from 1 mm down to 500 $\mu$m | 30 wt. % |
| from 200 $\mu$m down to 60 $\mu$m | 30 wt. % |
| Material properties | |
| Heat resistance: the material withstood without failure not less than 100 heat cycles at 1000° C, water; | |
| Compressive strength at 20° C:  1500 kg/cm$^2$. | |

EXAMPLE 2

A heat-resistant material consisted of an oxidizing ceramic matrix of stabilized zirconia and a filler of ground zirconia monocrystals.

| Matrix | 60 wt. % |
|---|---|
| Filler | 40 wt. % |
| The degree of the filler dispersion was as follows: | |
| from 2 mm down to 1 mm | 20 wt. % |
| from 1 mm down to 500 $\mu$m | 40 wt. % |
| from 500 $\mu$m down to 100 $\mu$m | 20 wt. % |
| from 100 $\mu$m down to 60 $\mu$m | 20 wt. % |
| Material properties | |
| Heat resistance: the material withstood without failure not less than 50 heat cycles at 1000° C, water; | |
| Compressive strength at 20° C:  10,000 kg/cm$^2$ | |

EXAMPLE 3

A heat-resistant material consisted of an oxygen-free ceramic matrix columbium carbide of and a filler of ground monocrystals of stabilized hafnium dioxide.

| Matrix | 80 wt. % |
|---|---|
| Filler | 20 wt. % |
| The degree of the filler dispersion was: | |
| from 1 mm down to 200 $\mu$m | 70 wt. % |
| from 200 $\mu$m down to 60 $\mu$m | 30 wt. % |
| Material properties | |
| Heat resistance: the material withstood without failure not less than 100 heat cycles at 1200° C, water; | |
| Compressive strength at 20° C:  7500 kg/cm$^2$ | |

EXAMPLE 4

A heat-resistant material consisted of an oxygen-free ceramic matrix and a filler of ground monocrystals of magnesium oxide (periclase).

| Matrix | 50 wt. % |
|---|---|
| Filler | 50 wt. % |
| Material properties | |
| Oxidation resistance: gain in weight at 1000° C in air for 10 hours was 20 mg/cm$^2$; | |
| Compressive strength at 20° C:  1000 kg/cm$^2$ | |

EXAMPLE 5

A heat-resistant material consisted of an oxidizing ceramic matrix of mullite and a filler of ground monocrystals of magnesium-aluminium spinel.

| Matrix | 65 wt. % |
|---|---|
| Filler | 35 wt. % |
| The degree of the filler dispersion was as follows: | |
| from 1.5 mm down to 500 $\mu$m | 40 wt. % |
| from 500 $\mu$m down to 100 $\mu$m | 30 wt. % |
| from 100 $\mu$m down to 60 $\mu$m | 30 wt. % |
| Material properties | |
| Heat resistance: the material withstood without failure not less than 75 heat cycles at 1000° C, water; | |
| Compressive strength at 20° C:  6000 kg/cm$^2$ | |

EXAMPLE 6

A heat-resistant material consisted of an oxygen-free ceramic matrix of zirconium diboride and a filler of ground monocrystals of yttrium oxide.

| Matrix | 55 wt. % |
|---|---|
| Filler | 45 wt. % |

The degree of the filler dispersion as follows:

| from 1 mm down to 200 $\mu$m | 70 wt. % |
|---|---|
| from 200 $\mu$m down to 60 $\mu$m | 30 wt. % |
| Material properties | |
| Oxidation: gain in weight at 1000° C in air for 10 hours about 10 mg/cm$^2$. | |

-continued

| | |
|---|---|
| Compressive strength at 20° C: | 5500 kg/cm² |
| Heat resistance: the material withstood without failure not less than 50 cycles at 1000° C, water. | |

EXAMPLE 7

A heat-resistant material consisted of a cermet matrix containing 60 wt. % aluminium oxide and 40 wt. % metallic chromium and a filler of ground monocrystals of erbium oxide.

| | |
|---|---|
| Matrix | 70 wt. % |
| Filler | 30 wt. % |

The degree of the filler dispersion as follows:

| | |
|---|---|
| from 1 mm down to 500 μm | 40 wt. % |
| from 500 μm down to 200 μm | 40 wt. % |
| from 200 μm down to 60 μm | 20 wt. % |
| Material properties | |
| Oxidation: gain in weight at 1300° C in air for 10 hours was about 20 mg/cm²; | |
| Compressive strength at 20° C: | 10,000 kg/cm². |

EXAMPLE 8

A heat-resistant material consisted of a cermet matrix comprising 70 wt. % chromium oxide and 30 wt. % metallic chromium and a filler of ground monocrystals of yttrium aluminium garnet.

| | |
|---|---|
| Matrix | 60 wt. % |
| Filler | 40 wt. % |
| The degree of the filler dispersion was as follows: | |
| from 2 mm down to 1 mm | 40 wt. % |
| from 1 mm down to 500 μm | 30 wt. % |
| from 500 μm down to 200 μm | 20 wt. % |
| from 200 μm down to 60 μm | 10 wt. % |
| Material properties | |
| Oxidation: gain in weight at 1300° C in air for 10 hours amounted to about 15 mg/cm²; | |
| Compressive strength at 20° C: | 4000 kg/cm² |

EXAMPLE 9

A heat-resistant material consisted of a cermet matrix containing 90 wt. % zirconium carbide and 10 wt.% metallic nickel and a filler of ground stabilized zirconia monocrystals.

| | |
|---|---|
| Matrix | 80 wt. % |
| Filler | 20 wt. % |
| The degree of the filler dispersion was: | |
| from 1 mm down to 500 μm | 30 wt. % |
| from 500 μm down to 200 μm | 40 wt. % |
| from 200 μm down to 60 μm | 30 wt. % |
| Material properties | |
| Oxidation: gain in weight at 1000° C in air for 10 hours 30 mg/cm²; | |
| Compressive strength at 20° C: | 7000 kg/cm² |

EXAMPLE 10

A heat-resistant material consisted of a metallic molybdenum matrix and a filler of ground monocrystals of stabilized hafnium dioxide:

| | |
|---|---|
| Matrix | 98 wt. % |
| Filler | 2 wt. % |

EXAMPLE 11

A heat-resistant material consisted of a nickel-chromium alloy matrix and a filler of ground stabilized zirconia monocrystals.

| | |
|---|---|
| Matrix | 10 wt. % |
| Filler | 90 wt. % |
| The degree of the filler dispersion was as follows: | |
| from 1 mm down to 500 μm | 10 wt. % |
| from 500 μm down to 200 μm | 10 wt. % |
| from 200 μm down to 60 μm | 10 wt. % |
| from 60 μm down to 10 μm | 70 wt. % |
| Material properties | |
| Oxidation: gain in weight at 1300° C in air for 10 hours was about 10 mg/cm²; | |
| Creep at 1000° C and under a load of 4.5 kg/cm² was 1.59 | |

EXAMPLE 12

A heat-resistant material consisted of a metallic tungsten matrix and a filler of ground ruby monocrystals.

| | |
|---|---|
| Matrix | 99 wt. % |
| Filler | 1 wt. % |

The degree of the filler dispersion was from 5 μm down to 1 μm.

Material properties: creep at 1500° C and a specific load of 4.5 kg/cm² was 1%.

EXAMPLE 13

A heat-resistant material consisted of a metallic chromium matrix and a filler of ground magnesium oxide (periclase) monocrystals.

| | |
|---|---|
| Matrix | 95 wt. % |
| Filler | 5 wt. % |

The degree of the filler dispersion was from 10 μm down to 1 μm.

Material properties: creep at 1200° C and a specific load of 4.5 kg/cm² was 3%.

EXAMPLE 14

A heat-resistant material consisted of a high-alumina cement matrix and a filler of ground ruby monocrystals.

| | |
|---|---|
| Matrix | 40 wt. % |
| Filler | 60 wt. % |

The degree of the filler dispersion was as follows:

| | |
|---|---|
| from 2 mm down to 1 mm | 50 wt. % |
| from 1 mm down to 500 μm | 20 wt. % |
| from 500 μm down to 100 μm | 10 wt. % |
| from 100 μm down to 60 μm | 20 wt. % |
| Material properties | |
| Heat resistance: the material withstood without failure not less than 50 cycles at 1200° C, water; | |

-continued

Compressive strength at 20° C: 1000 kg/cm².

EXAMPLE 15

A heat-resistant material consisted of a matrix of an aluminophosphate binder and a filler of ground monocrystals of magnesium oxide (periclase).

| Matrix | 20 wt. % |
|---|---|
| Filler | 80 wt. % |

The degree of the filler dispersion was as follows:

| from 2 mm down to 1 mm | 20 wt. % |
|---|---|
| from 1 mm down to 500 μm | 20 wt. % |
| from 500 μm down to 100 μm | 20 wt. % |
| from 100 μm down to 60 μm | 40 wt. % |
| Material properties | |
| Heat resistance: the material withstood without failure not less than 75 heat cycles at 1000° C, water; | |
| Compressive strength at 20° C: 750 kg/cm² | |

EXAMPLE 16

A heat-resistant material consisting of a matrix of molten sodium glass and a filler of ground zirconia monocrystals.

| Matrix | 10 wt. % |
|---|---|
| Filler | 90 wt. % |

The degree of the filler dispersion was as follows:

| from 2 mm down to 1 mm | 20 wt. % |
|---|---|
| from 1 mm down to 500 μm | 10 wt. % |
| from 500 μm down to 100 μm | 20 wt. % |
| from 100 μm down to 60 μm | 20 wt. % |
| from 60 μm down to 10 μm | 30 wt. % |
| Material properties | |
| Heat resistance: the material withstood without failure not less than 50 heat cycles at 1000° C, water; | |
| Compressive strength at 20° C: 800 kg/cm². | |

EXAMPLE 17

A heat-resistant material consisted of a matrix of a chromium-phosphate binder and a filler of ground beryllium oxide monocrystals.

| Matrix | 10 wt. % |
|---|---|
| Filler | 90 wt. % |

The degree of the filler dispersion was as follows:

| from 2 mm down to 1 mm | 30 wt. % |
|---|---|
| from 1 mm down to 500 μm | 20 wt. % |
| from 500 μm down to 100 μm | 10 wt. % |
| from 100 μm down to 60 μm | 10 wt. % |
| from 60 μm down to 10 μm | 30 wt. % |
| Material properties | |
| Heat resistance: the material withstood without failure not less than 100 cycles at 1000° C, water; | |
| Compressive strength at 20° C: 800 kg/cm² | |

What is claimed is:

1. A heat-resistant sintered material consisting of a matrix made of a metal-ceramic selected from the group consisting of chromium-aluminium oxide, chromium-chromium oxide and nickel-zirconium carbide and a filler of ground monocrystals with a particle size of from 1 μm to 2 mm of a refractory oxide selected from the group consisting of ruby, zirconia, hafnium dioxide, magnesium oxide, magnesium-aluminium spinel, yttrium oxide, erbium oxide, yttrium aluminium garnet and beryllium oxide.

2. The material as claimed in claim 1, wherein the metal-ceramic is chromium-aluminium oxide and the refractory oxide is erbium oxide.

3. The material as claimed in claim 1, wherein the metal-ceramic is chromium-chromium oxide and the refractory oxide is yttrium aluminium garnet.

4. The material as claimed in claim 1, wherein the metal-ceramic is nickel-zirconium carbide and the refractory oxide is zirconia.

5. The material as claimed in claim 1, wherein the filler is present in an amount of from 1 to 90% of the total weight of the material.

* * * * *